United States Patent Office 3,050,432
Patented Aug. 21, 1962

1

3,050,432

PROCESS FOR COMPRESSING CELLULAR POLYURETHANE PLASTIC

Erwin Weinbrenner and Wilhelm Tischbein, Leverkusen, Peter Hoppe, Troisdorf, and Franzkarl Brochhagen, Odenthal, Germany, assignors, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware No Drawing. Filed Oct. 25, 1957, Ser. No. 692,258
Claims priority, application Germany Oct. 27, 1956
5 Claims. (Cl. 156—196)

This invention relates generally to plastic foams and, more particularly, to an improved process for the manufacture of a water and air pervious plastic which is not pervious to liquids.

It is known to manufacture laminated materials by uniting plastics to supporting materials, for example, by spreading softened polyvinyl chloride on a fabric web and allowing to gelatinize. Such laminated materials, which are more especially used as artificial leather, are impervious to air and water vapor. It is desired to manufacture laminated materials and especially artificial leathers which have the property of being able to breathe in the same way as natural leather, i.e., to be pervious to air and water vapor, without, however, allowing passage of liquids. For this purpose, attempts have already been made to incorporate blowing agents into the plastic layer, or even mechanically to drill through the prepared laminated materials or to burn thin passages through the artificial leather by means of electric sparks. However, none of these processes is satisfactory. The artificial leather is still too heavy and under heavy stressing, for example, for motorcycle clothing, it allows rain water to pass through.

It is therefore an object of the present invention to provide a process for the production of laminated materials pervious to water vapor but not to liquids. A further object of the present invention is to provide a process for the production of laminated material which is similar to natural leather and is capable of breathing and pervious to air and water vapor. A further object of the present invention is the process for the production of laminated material which is similar to natural leather and is capable of breathing and is pervious to air and water vapor and useful for making articles of clothing and the like. A still further object is to provide a product which is pervious to air and water vapor and resembles in appearance artificial leather.

Generally speaking, the foregoing objects and others are accomplished by providing a process which involves compressing a cellular plastic to the point where it will remain substantially in the compressed state after the pressure has been removed but not to the point where the cellular plastic entirely loses its porous structure and permeability to air and vapors. The invention thus contemplates a process wherein a cellular plastic is compressed under pressure at an elevated temperature until the thickness thereof is preferably not less than about 5 percent of its original thickness, still pervious to air and gases because the cell structure has not been entirely destroyed. The cellular plastic preferably must be compressed to a point where its thickness is not more than about 15 percent of its original thickness in order to be pervious to gases but impervious to liquids.

The formation of cellular plastics having urethane linkages involves essentially a polyaddition between polyesters and polyisocyanates although, in compounding to obtain the final products, other materials, such as fillers, accelerators and/or cross-linking agents are desirably added. When foamed products are sought, water on an aqueout solution may also be employed. The plastic materials having a specific gravity of about 0.02 to about 1.0 are porous and are classified as foamed plastics; those which have a specific gravity of about 1.0 to about 1.4 are nonporous and are designated as homogeneous plastics.

2

Webs of any suitable cellular plastic may be used, such as, for example, latex foam, polyvinyl chloride foam, polystyrene foam and the like. It is preferred, however, to use a cellular plastic which contains urethane groups. The following description is therefore given with respect to cellular polyurethanes, but it is to be understood that other plastics may be processed in accordance with the invention described. Cellular polyurethane plastics may be made by reacting any organic compound having at least two reactive hydrogens and a molecular weight of at least 500 with a polyisocyanate in known manner and if necessary with concurrent use of water, activators and emulsifiers together with dyes, fillers and additives, for example, fireproofing agents or formicides. The organic compound having reactive hydrogens may be a polyester, a polyisocyanate-modified polyester, a polyesteramide, a polyisocyanate-modified polyesteramide, a polyalkylene ether glycol and polyisocyanate-modified polyalkylene ether glycols such as those disclosed in U.S. Patent 2,764,565.

Preferably, the polyesters used for the production of the polyurethanes have a specific gravity in the range of about 0.02 to about 1.4 (i.e., those of rigid, semi-rigid or elastic consistency) may be branched and/or linear. Thus, the useful polyesters and polyesteramides may include those obtained by condensing any polybasic (preferably dibasic carboxylic) organic acid, such as adipic, sebacic, 6-amino-caproic, phthalic, isophthalic, terephthalic, oxalic, malonic, succinic, maleic, cyclohexane-1,2-dicarboxylic, cyclohexane-1,4-dicarboxylic, polyacrylic, naphthalene-1,2-dicarboxylic, fumaric, itaconic, etc., with polyalcohols, such as ethylene glycol, diethylene glycol, pentaglycol, glycerol, sorbitol, triethanalomine, di-($\beta$-hydroxy ethyl) ether, etc. and/or amino-alcohols, such as ethanolamine, 3-aminopropanol, 4-aminopropanol, 5-aminopentanol-1,6-aminohexanol, 10-amino-decanol, 6-amino-5-methylhexanol-1, p-hydroxylmethyl-benzylamine, etc.; and with mixtures of the above polyalcohols and amines (ethylene diamine, hexamethylene diamine, 3-methylhexamethylene diamine, decamethylene diamine and m-phenylenediamine, etc.) and/or amino-alcohols, etc. In the esterification, the acid per se may be used for condensation or where desirable, equivalent components, such as the acid halide or anhydride, may be used.

The polyalkylene ether glycols used in the practice of the invention may include the condensation product of an alkylene oxide, such as, for example, ethylene oxide or propylene oxide.

Broadly, any of the prior art polyesters, polyisocyanate-modified polyesters, polyesteramides, polyisocyanate-modified polyesteramides, alkylene glycols, polyisocyanate-modified alkylene glycols, polyoxyalkylene glycols and polyisocyanate-modified polyoxyalkylene glycols, etc., having free reactive hydrogen atoms, free reactive carboxylic and/or especially hydroxyl groups may be employed in the process of the invention and condensed in the apparatus useful for carrying out that process. Moreover, any organic compound containing at least two radicals selected from the class consisting of hydroxyl and carboxyl groups may be employed in the practice of the invention.

Any suitable organic polyisocyanates may be used in the practice of the invention including ethylene diisocyanate, ethylidene diisocyanate, propylene-1,2-diisocyanate, butylene-1,3-diisocyanate, hexylene-1,6-diisocyanate, cyclohexylene-1,2-diisocyanate, m-phenylene diisocyanate, 2,4-toluylene diisocyanate, 1,6-toluylene diisocyanate, 3,3'- dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, triphenylmethane triisocyanate, 1,5-naphthalene diisocyanate or polyisocyanates in a blocked or inactive form, such as the bis-phenyl carbamates of toluylene diisocyanate, p,p'-diphenylmethane diisocyanate, p-phenylene diisocyanate and 1,5-naphthalene diisocyanate, and the like.

The polyisocyanate and polyester may be reacted together in the presence of an activator mixture. The activator mixture may be made up of at least one cross-linking agent and/or an accelerator and may contain, if desired, added water or an aqueous solution. The addition of such an activator mixture to the mixture of polyisocyanates and polyesters initiates the cross-linking action needed to obtain homogeneous plastics or the cross-linking and foaming action necessary to obtain foam plastics. Useful cross-linking agents include water or aqeuous solutions for foamed plastics and the polyalcohols, such as ethylene glycol, propylene glycol, butylene glycol, diethylene glycol, triethylene glycol, glycerol, etc., for non-porous plastics; and useful accelerators include the tertiary amines (either individually or in mixtures), such as dimethylhexahydroaniline, diethylhexahydroaniline, reaction products of N,N'-diethylaminoethanol and phenylisocyanate, ester amines, etc. Also sodium phenolates, added with suitable plasticizers, may be employed in the manufacture of foamed products.

In the practice of the invention, webs of cellular plastic produced from the normal reaction of a polyisocyanate and organic compound having reactive hydrogens of any desired thickness, for example, from about 5 millimeters to about 10 millimeters, are compressed at elevated temperature and pressure, for example, under a platen press. The compression can readily be to an extent of 10–15 times and, thus, a strip of foam material with a thickness of about 5–10 mm. preferably is compressed to about 0.5 to about 0.75 mm. The result of this compression is fabric-like structures which permit passage of air and water vapor according to their degree of deformation but do not permit passage of liquids.

In accordance with the process of the invention, only one web may be compressed or a plurality of webs of foam material may be laid one upon the other and jointly compressed, these webs being united firmly one to another. By using in such a case foam materials which are of different colors or foam materials of different specific weight, or of different pore size, elasticity or hardness, it is possible to produce a very wide range of different surface effects.

Furthermore, it is also possible for pervious fabric layers to be applied for strengthening purposes to the surface of the webs of foam material prior to compressing the latter and/or for these fabric layers to be placed between the webs of foam material when several of these are compressed. These fabric webs are also united with the compressing process, this causing a greater tensile strength and resistance to further tearing of the fabric-like structures.

The time required for the compression, and the pressure and the temperature used depend on the deformation intensity. Preferably, temperatures from about 130° C. to about 250° C. will be used with a pressing time of about 10 seconds to about 10 minutes. It is possible to work at low pressures of, for example, 5 atm., and also at medium and high pressures, for example, at about 30 and 200 atmospheres. In order not to close the pores during the compression of the foam material and thereby produce a dense structure, care is to be taken that the compression is terminated at a certain lower limit which, of course, depends on the thickness of the original web of foam material. As pointed out hereinbefore, it is readily possible for a web of foam material with a thickness of about 5 to about 10 mm. to be compressed to about 0.5 mm. A foam material web of, for example, 20 mm. thickness can be compressed to about 1 to 2 mm.

It also comes within the scope of the present invention to provide the laminated foam materials which can be produced thereby with a plastic covering. For example, a thin layer of softened or plasticized polyvinyl chloride is suitable as such layer, in the presence of salts, such as, sodium bicarbonate or sodium chloride being incorporated into the plastic layer. After hardening of the polyvinyl chloride layer, these salts can be dissolved out in known manner with water, whereby satisfactory permeability of the plastic layer to water vapor and air is produced. The said material is thereafter embossed or stamped. A thin layer of a mixture of an isocyanate-polyester containing terminal hydroxyl groups with a polyisocyanate can advantageously be used as the plastic layer. During the reaction and consolidation of such a plastic layer, a very small quantity of carbon dioxide is produced, which forms microscopic passages on escaping, thus insuring permeability to water vapor, of the plastic support.

By means of the process described, it is possible to manufacture light-weight synthetic leathers which are capable of breathing and which are pervious to air and water vapor but not pervious to liquids, the surface of such leathers being capable of modification in many different ways by suitable choice of separate layers. Laminated foam materials compressed in this manner can also be used for filters, for articles of clothing, for blankets, and the like.

The invention is further illustrated but not limited by the following examples:

*Example 1*

A sheet of foam material containing urethane linkages produced by reacting a polyester with a diisocyanate to obtain a foam having a thickness of about 5 millimeters to about 10 millimeters, a specific weight of 40 and a pore size of about 0.5 millimeter to about 2 millimeters, is compressed under a platen press at about 170° C. to about 190° C. for a pressing period of about 1 minute to about 3 minutes under a pressure of about 15 atmospheres to about 30 atmospheres to a thickness of about 0.6 mm. to about 0.7 mm.

The aforementioned sheet of foam material can also be compressed in a calender, the gap width of the calender rollers being about 0.3 mm. to about 0.4 mm. and the said rollers being kept at a temperature of about 170° C. to about 190° C. The working speed is about 5 m./min. to about 10 m./min. The material obtained has a very good tensile strength and good permeability to water vapor. With an air humidity of 85 percent, the permeation of water vapor is 546 g./m.$^2$/day.

The webs of foam material obtained according to this Example may be used as filter inserts.

*Example 2*

A sheet of foam material according to Example 1 is compressed to about 0.6 millimeter together with a thin layer of bandaging material on a platen press at a temperature of about 160° to about 175° C. and at a pressure of about 15 to about 30 atmospheres over a pressing time of about 1 to about 3 minutes.

It is also possible for bandaging material to be laid between two sheets of foam material, each with a thickness of about 5 mm. and to compress the combination to, for example, about 0.6 mm., under the conditions indicated in Example 1.

The material-like structure thus obtained shows a strong bonding between the webs of foam material and fabric. The resistance to further tearing is greater than that of the materials obtained according to Example 1. The permeability to water vapor in the present case is about 558 g./m.$^2$/day with an air humidity of about 85 percent.

*Example 3*

A sheet of foam material about 5 millimeters thick containing urethane groups with a pore diameter of about 0.5 mm. and a specific weight of about 40 is compressed in a press under the conditions indicated in Example 1 together with a second sheet of foam material which is also about 5 mm. thick, and which has a pore diameter of about 2 mm. and a specific weight of about 60. The result is a fabric-like material with two different outer surfaces. The two webs are firmly united one to another.

The webs of foam material can be dyed with any suitable azo or anthraquinone dye as required to produce a special surface effect, or can also have intermediate fabric layers.

*Example 4*

The web of foam material compressed according to Example 3 has applied thereto in one or two operations a thin layer of a reaction product obtained from about 100 parts of a polyester of adipic acid, ethylene glycol and diethylene glycol (about 30 percent solution in ethyl acetate/acetone) with about 10 parts of a reaction product of about 1 mol of trimethylol propane and about 3 mols of toluylene diisocyanate (about 75 percent solution in ethyl acetate). Before applying the mixture, the latter has added thereto about 5 parts of about a 10 percent solution in ethyl acetate/trichloroethylene of a reaction product obtained from about 1 mol of methyl diethanolamine and about 2 mols of phenyl isocyanate, with which are admixed about 30 per cent of titanium tetrasterylate, about 30 parts of kaolin and about 3 parts of a red monazo pigment dyestuff. The layer is allowed to complete the reaction at about 60° to about 80° C.

*Example 5*

A sheet of foam material compressed according to Example 3 has the following mixture applied thereto: about 60 parts of plasticized polyvinyl chloride, about 20 parts of dioctyl phthalate, about 0.5 part of monophenyl urea, about 10 parts of kaolin, about 5 parts of chromium oxide and about 10 parts of common salt. The layer is gelled for about 3 minutes at about 175° C. After cooling, the common salt is dissolved out by rinsing with warm water.

*Example 6*

A sheet of foam material about 2.5 centimeters thick and made from plasticized polyvinyl chloride (70:30) is compressed to about 1 millimeter under a platen press for about 3 minutes at about 170° C., using a pressure of about 100 to about 200 atmospheres. The fabric-like material obtained has a good tensile strength and good permeability to water vapor but is, on the other hand, completely liquid-proof.

*Example 7*

A slab of foam containing urethane groups, about 20 millimeters thick, with a specific weight of about 40 is compressed in a platen press for about 5 minutes under about 200 atmospheres pressure. While the lower plate of the platen press remains cold, the upper plate has a temperature of about 230° to about 250° C. The foam slab is compressed to a thickness of about 5 mm. and undergoes hot deformation. This way a foam slab is formed which is unequally compressed.

By way of the above compression method, the mechanical properties of the foam are also improved, e.g., foam that prior to compression displayed the following characteristics:

| | | |
|---|---|---|
| Density app | kg./m.$^3$ | 70 |
| Tear Resistance | kg./cm | 0.39 |
| Tensile strength | kg./cm.$^2$ | 1.14 |
| Elongation | percent | 173 |

while the same foam after compression showed the following characteristics:

| | | |
|---|---|---|
| Density | kg./m.$^3$ | 87 |
| Tear resistance | kg./cm | 1.01 |
| Tensile strength | kg./cm.$^2$ | 2.31 |
| Elongation | percent | 308 |

Although certain representative embodiments and details have been shown for the purpose of illustrating this invention, it will be apparent to those skilled in the art that various changes and modifications may be made therein without departing from the spirit and scope of the invention except as set forth in the claims.

What is claimed is:

1. A method for converting a normally air and water vapor impervious solid cellular polyurethane plastic into a porous web which is pervious to air but is impervious to liquids which comprises compressing the cellular plastic at a temperature above 20° C. under a pressure of from about 5 to about 200 atmospheres until the thickness of the cellular plastic remains at from about 5 percent to about 15 percent of its original thickness after the pressure has been removed.

2. A method for making a porous web from a cellular polyurethane plastic which is pervious to air and water vapor and impervious to a liquid which comprises compressing at a temperature above about 20° C. a cellular polyurethane plastic until the thickness thereof remains at from about 5% to about 15% of its original thickness after the pressure has been removed.

3. A method for making a fabric which is pervious to air and water vapor and impervious to a liquid which comprises compressing a pervious fabric and a cellular polyurethane plastic at a temperature above about 20° C. until the thickness of the said cellular plastic remains at from about 5% to about 15% of its original thickness after the pressure has been removed.

4. A method for making a laminated material which is pervious to air and water vapor and impervious to a liquid which comprises compressing a plurality of webs of a cellular polyurethane plastic having a fabric layer lying therebetween at a temperature above about 20° C. until the thickness of each of the said cellular polyurethane webs remains at from about 5% to about 15% of the original thickness thereof after the pressure has been removed.

5. A process for the manufacture of a porous web of a laminated material which is pervious to air and water vapor, which comprises compressing a solid cellular polyurethane plastic material having a polyvinyl chloride surface layer thereon at a temperature above about 20° C. until the thickness of the cellular plastic remains at about 5% to about 15% of its original thickness after the pressure has been removed.

References Cited in the file of this patent

UNITED STATES PATENTS

| | | |
|---|---|---|
| 2,268,160 | Miles | Dec. 30, 1941 |
| 2,454,678 | Smith | Nov. 23, 1948 |
| 2,521,470 | Matheson | Sept. 5, 1950 |
| 2,676,164 | Charlton et al. | Apr. 20, 1954 |
| 2,740,743 | Pace et al. | Apr. 3, 1956 |
| 2,759,475 | Van Swaay | Aug. 21, 1956 |
| 2,781,757 | Hauser et al. | Feb. 19, 1957 |
| 2,826,509 | Sarbach | Mar. 11, 1958 |
| 2,878,153 | Hacklander | Mar. 17, 1959 |
| 2,899,708 | Donaldson et al. | Aug. 18, 1959 |